United States Patent [19]
Guilmette

[11] Patent Number: 5,531,357
[45] Date of Patent: Jul. 2, 1996

[54] HOSE CONTAINMENT SYSTEM

[75] Inventor: Bruce T. Guilmette, Ortonville, Mich.

[73] Assignee: Foamseal, Inc., Oxford, Mich.

[21] Appl. No.: 326,589

[22] Filed: Oct. 20, 1994

[51] Int. Cl.⁶ .................................................. B67D 5/08
[52] U.S. Cl. ......................... 222/1; 222/23; 222/52; 222/63; 222/135; 73/40.5 R; 138/103
[58] Field of Search .................................. 222/1, 23, 39, 222/40, 52, 61, 63, 71, 73–75, 135, 145.1; 73/40, 40.5 R, 49.5; 138/103–114

[56] References Cited

U.S. PATENT DOCUMENTS

| | | | |
|---|---|---|---|
| 4,154,368 | 5/1979 | Gusmer et al. | 222/135 |
| 4,259,553 | 3/1981 | Tanaka et al. | 138/103 X |
| 4,496,077 | 1/1985 | Zuehlsdorf | 222/61 |
| 4,775,855 | 10/1988 | Cox | 73/40.5 R X |
| 5,086,403 | 2/1992 | Slocum et al. | 222/52 X |
| 5,102,012 | 4/1992 | Foster | 73/40.5 R X |
| 5,271,901 | 12/1993 | Issel et al. | 73/40.5 R X |
| 5,325,706 | 7/1994 | Grose | 222/52 X |
| 5,343,738 | 9/1994 | Skaggs | 73/40.5 R |
| 5,373,454 | 12/1994 | Andrejasich et al. | 222/52 X |
| 5,394,904 | 3/1995 | Winter et al. | 138/103 X |

*Primary Examiner*—Kevin P. Shaver
*Attorney, Agent, or Firm*—Howard & Howard

[57] ABSTRACT

A foam delivery system includes a pump for delivering a pressurized flow of material to a dispenser through a flexible hose. The hose is encased in a flexible, expansible sheath which contains any material which may leak along the hose. The sheath expands in the region of the leak to accommodate the released material and to indicate the presence of the leak. The system also includes a monitor which senses a leak condition and then terminates the pressurized flow of material.

19 Claims, 3 Drawing Sheets

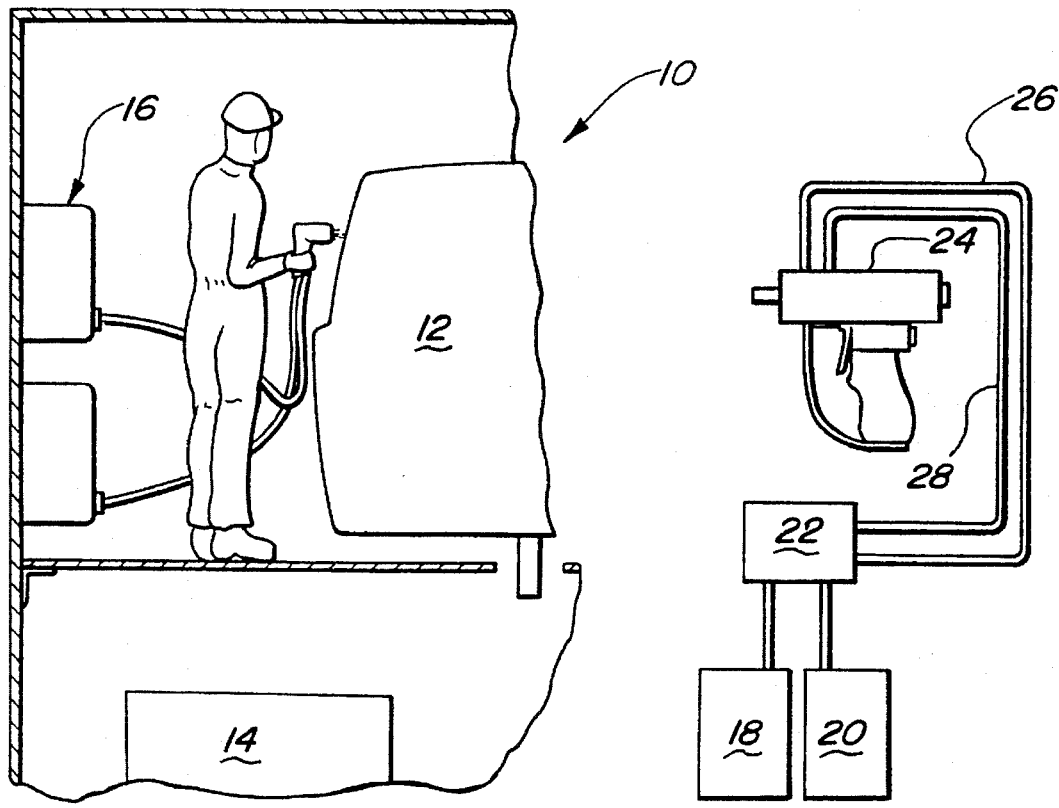
Fig-1
PRIOR ART
Fig-2
PRIOR ART
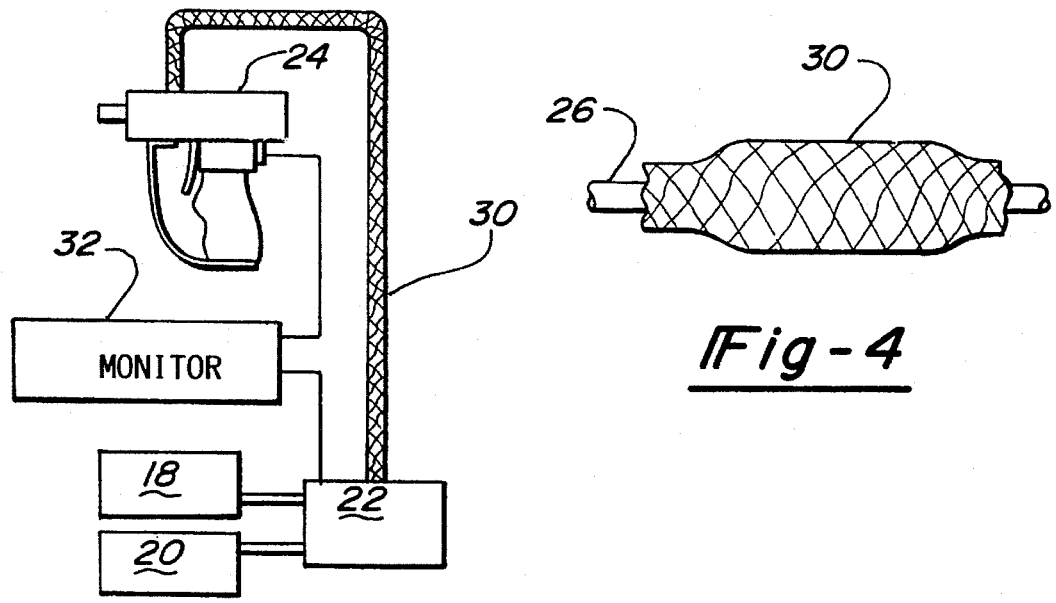
Fig-3
Fig-4

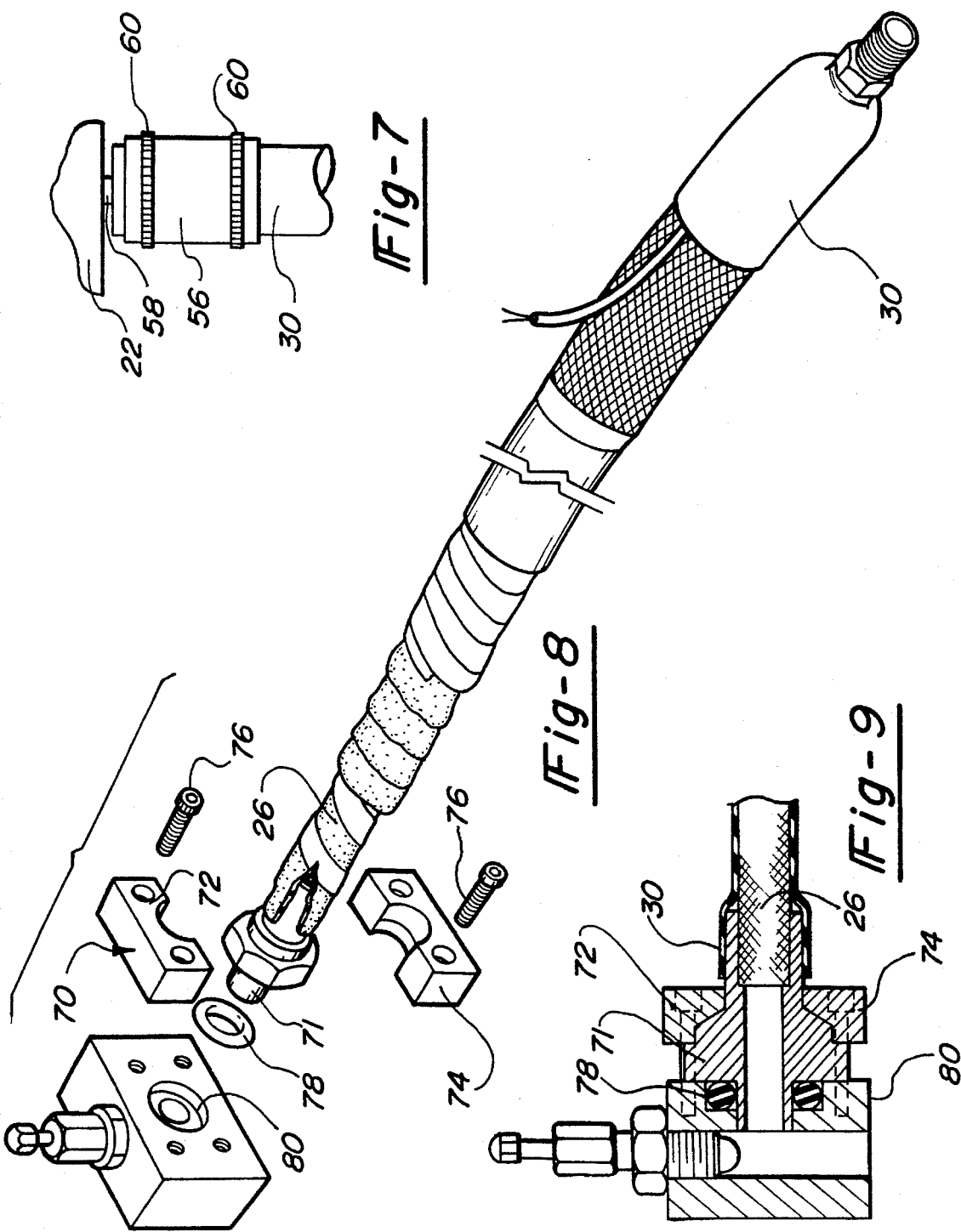

HOSE CONTAINMENT SYSTEM

BACKGROUND OF THE INVENTION

This invention relates to a system and method for detecting, containing and limiting leaks in a system for delivering foam.

Polymeric foams, including polyurethane and polyurea foams, are finding ever increasing use as sealants, fillers and protective coatings. These materials have low thermal conductivities; they are good absorbers of sound and other mechanical vibrations and they are electrically insulating. They exhibit a high degree of adhesion to a variety of substrates and have long-term stability under a wide range of ambient conditions. As a consequence, polymeric foams are of growing use in a variety of manufacturing processes. For example, polymeric foam materials are injected into hollow body cavities in motor vehicles. The foam seals minor cracks and protects welds and other metallic surfaces from corrosion. Additionally, the foam provides a high degree of sound deadening and thermal insulation. Similarly, polymeric foam is sprayed onto floor pans and body panels of the vehicles.

A typical foam delivery system includes sources of foamable materials and a pump to deliver a pressurized flow of the materials. The delivery system further includes a dispenser gun which is in fluid communication with the pump by a length of flexible hose. In many systems, two separate materials are delivered to the dispenser gun by different hoses and are mixed in the gun to generate the foam. In other instances, both materials are delivered to the gun by a single hose. The present invention is applicable to either system.

The hose must have sufficient length to enable the operator to reach the areas where the foam is to be dispensed, without the need for moving the material holding tanks or pump. Additionally, the hose must be flexible and relatively lightweight. In many instances, the hose is externally heated, usually by an electrical resistance heating element. In use, the hose is subjected to mechanical stress by flexing, kinking, and stretching. The effects of such stress are compounded by the fact that the reagents are under pressure, and in most instances are heated to elevated temperatures. As a consequence, it has been found that the hose may sometimes allow leaks.

Leaks present a potential source of pollution and are of particular concern when foam is being used in closed manufacturing plants. Because of the problem of leakage, it has been typically necessary that the application of foams is performed in an enclosed containment booth.

The containment booths typically utilized in the automobile manufacturing industry, have been effectively identical to the complicated booths that have been built for paint spray booths. The air treatment circuitry used with paint spray booths has also been attached to the foam containment booths. For the most part, this air treatment circuitry is not in place to treat vapors or fumes from the spray to fill the vehicle bodies. Rather, the complicated containment booth and gas treatment circuitry have been put used simply for the chance of a leakage of the foam into the environment of the factory. It has been unacceptable to allow such leakage and resultant escape of the foam materials. As such, the containment booths, which typically cost over $1,000,000 to manufacture, have been utilized at each foam spraying station.

Containment booths are not only expensive to construct and operate; they also require dedication of significant manufacturing floor space. Additionally, the very requirement of a containment booth limits the mobility of the process and unduly complicates manufacturing. The requirement is particularly burdensome in the manufacture of motor vehicles, where it may be desirable to inject polymeric foam into a vehicle at a number of separate points along the manufacturing process; to do so would require many additional booths. Additionally, the use of a containment booth becomes more impractical when the foam sealant is being applied to trucks, buses, aircraft, ships and other large vehicles.

BRIEF DESCRIPTION OF THE INVENTION

A foam delivery system is disclosed which comprises a pump to deliver a pressurized flow of material to a dispenser gun. The dispenser gun is selectably operable to permit or block the flow of material. A flexible hose establishes fluid communication and conveys the pressurized flow of material between the pump and the dispenser. A flexible, expansible sheath covers the hose. In the event of a leak, the sheath expands to contain the escaping material. The expansion also serves to indicate the location of the leak.

The foam delivery system further includes a leak monitor which operates to shut down the pump in the event of a leak. The leak monitor may also sound an alarm. The foam delivery system typically includes two sources of reagents and two hoses for delivery of the reagents to the dispenser. The hoses may either be covered by a single expansible sheath or each hose may have its own sheath. The sheath may comprise a body of elastomeric material and may include a protective member, such as an outer body of polymeric mesh. The present invention also discloses a method for containing and identifying leaks, which is based upon the inventive apparatus.

In a sense, the present invention recognizes that the leakage from even the prior art hoses would not tend to be "burst," but would rather tend to be lower force leaks. The prior art hoses had several layers, and it is most unlikely that a "burst" would occur. By utilizing the expansible sheath, the invention can contain leakage for at least a short period of time, particularly the low force leakage that is to be expected with the multi-layer hoses. By combining that feature with the leak monitor, the invention ensures that a leak is detected prior to exceeding the ability of the sheath to contain the leak. Thus, containment booths become unnecessary.

The above objects and features of this invention are explained in greater detail in the following specification and drawings, of which the following is a brief description.

BRIEF DESCRIPTION OF DRAWINGS

FIG. 1 shows a prior art foam delivery system which includes an enclosed, ventilated containment booth;

FIG. 2 is a generalized foam delivery system of the prior art;

FIG. 3 is a schematic depiction of a foam delivery system which includes the present invention;

FIG. 4 is a depiction of a portion of a hose of a foam delivery system of the present invention, illustrating the manner in which the expansible sheath contains, and indicates the presence of, a leak;

FIG. 7 is a plan view of a jacket to contain leaks at a hose coupling point.

FIG. 8 is a cross-sectional view along line 8—8, as shown in FIG. 7.

FIG. 9 is a cross-sectional view along line 9—9, as shown in FIG. 8.

DETAILED DESCRIPTION OF THE INVENTION

Figure 5:
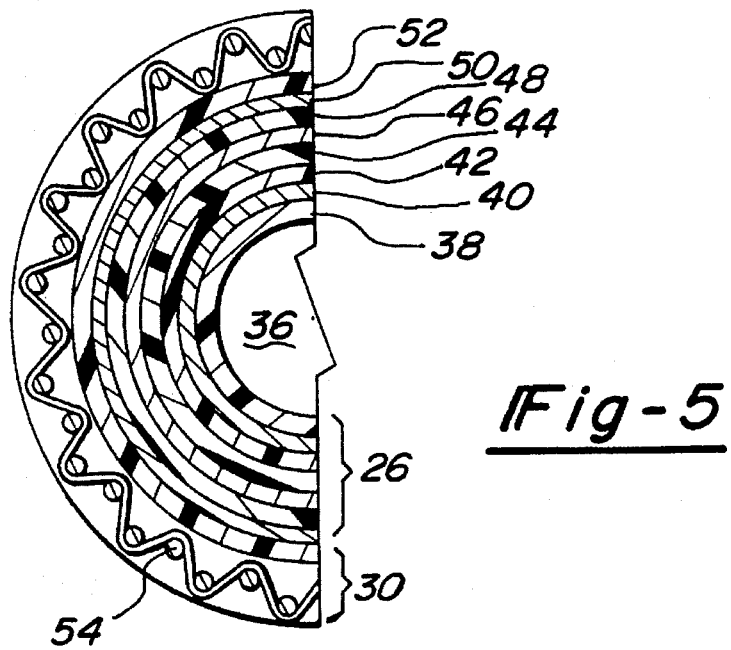
FIG. 5 is a cross-sectional view of a foam delivery hose according to the present invention.

The present invention provides for the containment of material which leak from a delivery system for delivering foam materials. As described above, such materials are widely used in the construction of motor vehicles. FIG. 1 illustrates a prior art approach to the problems caused by leaks of the materials in the workplace.

Prior art delivery systems were typically enclosed in ventilated containment booths 10, of the same type used in connection with paint spray operations. Booths of this type comprise large, enclosed structures configured to surround a portion of an assembly line and to contain a partially assembled motor vehicle 12. The booth 10 includes an air cleaning system 14, shown schematically. The booth 10 is also sufficiently large to enclose the foam delivery apparatus 16 and to provide for a worker to dispense foam into vehicle 12.

The air cleaning system 14 is of the type utilized in paint spray booths, and is only used to clean the air in the event of a leak. As anyone skilled in the air treatment industry knows, the air cleaning structures associated with a paint spray booth are expensive to construct, maintain and operate. The booth 10 also occupies a large amount of floor space, since it must be large enough to accommodate the vehicle, worker and foam delivery system. The containment booths typically cost over $1,000,000 to build; all for the possibility of leaking foam.

In many instances, it may be most efficient to apply the foam to the vehicle in various, separate stages of its assembly. The assembler is constrained, however, since to do so would require the use of a number of separate containment booths at many different locations along the assembly line. Economics preclude the use of a number of separate booths. Therefore, less than optimal use is often made of foam material. Clearly, it would be desirable to eliminate the use of the containment booth. Unfortunately, there has been no adequate means for containing leaks.

FIG. 2 show the generalized delivery system of the prior art, of the type which may be utilized in conjunction with the present invention. The delivery system includes a first material tank 18 and a second material tank 20. It should be understood that the present invention may be utilized in conjunction with various delivery systems which include a larger number of tanks, or a single tank. In the illustrated systems, each of the tanks 18, 20 is associated with pump 22, which operates to provide a pressurized flow of material from the tanks 18, 20. The pump 22 is in fluid communication with a spray gun 24 by a pair of delivery hoses 26, 28. In operation, the tanks 18, 20 and pump 22 provide a flow of material to the gun 24.

The pump 22 also meters the flow of the two materials to control the relative proportions provided to gun 24. The gun is selectably operable to permit, or to block, the flow of material. In a typical operation, the materials are mixed in the gun to react chemically and provide foam. The reaction mixture is delivered from the gun to the application site, which in the FIG. 1 embodiment is a vehicle body panel. A number of variants of the FIG. 2 system are known in the art. As noted above, the number of tanks may vary. Also, the pump may comprise a separate member associated with each of the tanks. Pumping may be accomplished by a displacement pump or by a source of pressurized gas in communication with the head space in each of the tanks. A variety of dispensers may be employed to deliver the materials to an application site. The precise configuration of the delivery device may also vary with the particular application, and within the context of this disclosure all such delivery devices will be referred to as guns.

The hoses are typically flexible hoses, but in some instances, at least a portion of the flexible hose may be replaced by a rigid conduit. In most instances, the temperature of the materials is controlled along the hose to optimize the reaction. Toward this end, the delivery hoses are typically insulated and/or heated. Although not illustrated, it is to be understood that the system of FIG. 2 is typically provided with threaded couplings between hoses 26, 28, the gun 24 and the pump 22. Additionally, threaded couplings are generally employed to establish communication between the tanks 18, 20 and pumping station 22. Equipment of the type generally described in FIG. 2 is manufactured by the Gusmer Corporation of Lakewood, N.J. and is available through Foamseal, Inc. of Oxford, Mich.

Referring to FIG. 3, a foam delivery system includes the containment system of the present invention. The apparatus of FIG. 3 includes material tanks 18, 20, pump 22 and gun 24 as previously described. A flexible, expansible sheath 30 now covers the hoses. The system further includes a leak monitor 32 which is in communication with the pump 22 and the delivery gun 24. The flexible, expansible sheath 30 is impermeable to the foam materials and is capable of expanding to contain any leaks from the hoses.

FIG. 4 illustrates a portion of a hose 26 having the sheath 30 disposed about its periphery. The sheath 30 has a bulge as a result of material having leaking from the hose 26 and having been trapped by the sheath 30. In this manner, the leaking material is confined. Also, the presence of the bulge indicates the approximate location of the leak. Upon the identification of a leak, the particular hose section can be removed and discarded.

Leak monitor 32 senses for a leak condition and terminates the flow of material to minimize the magnitude of the leak. As illustrated in FIG. 3, both of the hoses are enclosed in a single sheath. In alternative embodiments, each hose may be provided with its own sheath.

The present invention may be implemented with a wide variety of delivery hoses. FIG. 5 is a cross-sectional view of a portion of one particular delivery hose 26 including the sheath 30 of the present invention. In FIG. 5, the thickness of some layers comprising the hose has been exaggerated to clarify the illustration. Hose 26 may be a conventional, heated delivery hose of the type available from Foamseal, Inc. of Oxford, Mich. The hose 26 includes a plurality of layers defining a central lumen 36 which carries the material. In the illustrated embodiment, the hose is a electrically heated hose and comprises an inner layer 38 fabricated from an elastomeric material such as a synthetic rubber or a silicone rubber, which is non-reactive with the materials which will be carried in the hose. The hose further comprises a layer of braided metal mesh 40, which may also serve to carry electrical current and provide resistance heating. Outside the braided layer 40 is a silicone wrap 42 and a layer of electrically insulating material 44, such as a layer of synthetic rubber. Preferably, a layer of thermal insulation 46 is also included. One preferred insulating material is cotton batting. Another layer of silicone material 48 is disposed outside the cotton batting 46, and a layer of metal foil 50 is disposed outside the final silicone layer 48.

In the illustrated embodiment, the sheath of the present invention includes a layer of elastomeric material 52 and a layer of polymeric mesh 54. The elastomeric material 52 is selected to be resistant to materials carried in the hose, and to be capable of at least a twofold expansion and of withstanding pressures in excess of 500 psi. In one preferred embodiment, the elastomeric material comprises a natural or synthetic rubber, or a synthetic polymeric material such as a urethane.

In the illustrated embodiment, a layer of polymeric mesh 54 is disposed about the outside of the elastomeric layer 52, to protect the hose from scuffing during use. The layer of mesh also provides further pressure resistance. The mesh layer 54 typically comprises a polymeric material such as polypropylene, nylon or the like, although it is to be understood that woven textiles or metal mesh may be similarly employed.

As illustrated in FIG. 5, the flexible, expansible sheath 30 is shown as disposed in tight contact with the hose 26. It is to be understood that the sheath 30 may also be loosely fitted about the hose 26. It should be understood that sheath 20 is not connected to the inner layer of the hose 26 along the length of the hose. Rather, at each end of the hose, the sheath 30 is connected to the remainder of the hose 26 by some connection, such as a metallic band, a thermo or adhesive bond, or other similar permanent seals. In some embodiments, the expansible sheath 30 may be fabricated from a flexible, relatively non-elastomeric material such as a body of nylon, polypropylene or other such polymer. In such instance, the sheath may be fitted relatively loosely about the hose, and provision for expansion may be provided by pleating, gathering or folding the sheath.

As explained above, since there is such a large number of complicated layers comprising the hose 26, it is unlikely that any leak would create a "burst." Rather, leaks are typically low force leaks, and sheath 30 is constructed to readily contain any such leak, as shown, for instance, FIG. 4.

Leak monitor 32 operates to sense the occurrence of a leak along the hose and to terminate the flow of material to minimize the amount of leakage occurring. As illustrated in FIG. 3, the monitor 32 is in communication with the gun 24 and the pump 22.

Figure 6:
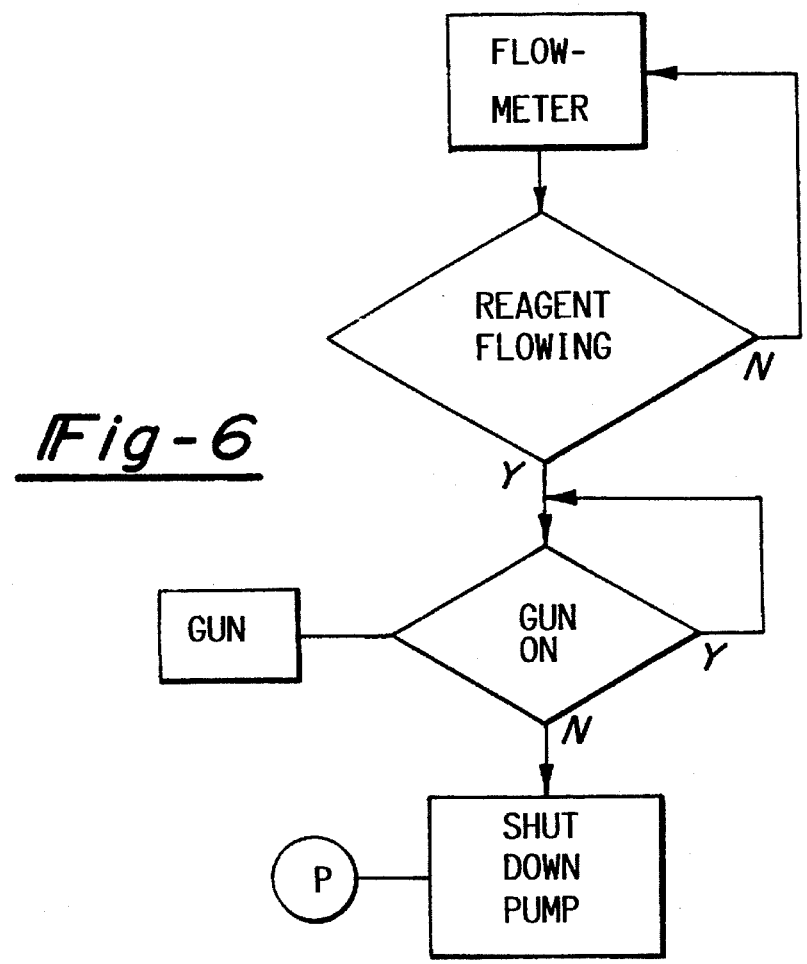
FIG. 6 is a flow chart depicting the operation of one embodiment of an inventive leak monitor.

As specifically illustrated by the flow chart of FIG. 6, the monitor 32 includes a flow meter in communication with the pump. The monitor determines if material is flowing from the pump and also determines whether the gun is delivering material. If material is flowing and the gun is not being operated to deliver material, a decision is made that a leak condition exists. The monitor 32 provides a signal which deactivates the pump. In general, it has been found that this relatively simple system will provide adequate leak detection and containment. The flow of material is typically measured by means of a flow meter, and one particularly preferred type of flow meter is a positive displacement meter. The monitor preferably includes a programmable logic controller for implementing the control logic steps, although a hard-wired system, a dedicated microprocessor, a computer or the like may be similarly employed.

Other configurations of monitors may be employed in the present invention. For example, the monitor may include a first pressure sensor to measure material pressure near the pump end of the hose, and a second pressure sensor to measure pressure near the gun. The two pressure signals can be compared to determine pressure drop. A pressure drop exceeding a predetermined magnitude will be indicative of a leak situation. A system of this type may be programmed to determine the presence of a leak both while the gun is operative to deliver material and while the gun is blocking the flow of reagent.

Obviously, a number of different logics could be utilized to monitor conditions and identify a leak. The application is not intended to be limited to any particular logic but, rather, to the broader concept of monitoring and identifying a leak, particularly in combination with the use of the inventive sheath.

As a further embodiment, both the flow meters and the pressure sensors can be utilized in combination. When the system is in use and allowing the flow of materials, a dramatic change in pressure would typically indicate a system malfunction, or leak. Thus, during use, the pressure sensors could be located adjacent to each end of the hose, and would be capable of determining the presence of a leak.

During the non-use portion of the cycle of the system, the flow meter and pressure sensor monitoring could also identify a leak. Fluid motion or pressure reduction provide an indication of a leak.

One other aspect that cannot be underestimated is continued operator monitoring of the hose along its length. The expandable sheath hose provides an indication of a leak, such as is shown in FIG. 4, and an operator monitoring the condition of the hose is able to identify any such leak quickly.

It has been found that the majority of the leaks are through connections between the hose and flow connectors leading to the gun or from the pump. As such, the inventive system pays extra attention to containing any leaks at those connector locations.

As shown in FIG. 7, further leak protection is provided by including a protective sleeve 56 fabricated from an expansible material, and which encloses joints and other connections in the foam delivery system. As shown, a pump 22 includes a conduit 58 connected to a hose which is covered by an elastomeric sheath 30. The joint between the conduit 58 and the hose 30 is enclosed by a jacket 56, which is sealed against the hose and conduit 58 of the pump 22 by a pair of hose clamps 60. The jacket 56 is fabricated from a flexible, expansible material, and may generally be made from a material similar to that used for the sheath 30. The jacket may optionally include a polymeric mesh protective layer. Such a protective sleeve may be used on all connections but is especially valuable in threaded connections.

Outer jacket 56 is connected outside the connection and attached by hose clamps 60. Outer jacket 56 is capable of expanding radially outwardly, much like the sheath 30, as shown in FIG. 4. As such, outer jacket 56 will also identify the presence and location of a leak, while, at the same time, still prevents the escape of any leakage material.

FIG. 8 is intended as a generally schematic view through an alternative type of connection for a hose according to the present invention. As shown, a split flange type clamp 70 connects the gun block 80 to a nipple flange connection 71 at the end of hose 26. Both sheath 30 and hose 26 are bonded onto nipple flange connection 71, as shown in FIG. 9. Flange connection 71 is received between two clamp parts 72 and 74 that are bolted at 76 to the block 80 to secure the parts together and tightly capture the flange connection 71 against block 80. As shown, an O-ring 78 may be received between the two to ensure an adequate seal.

FIG. 9 shows the clamp portions 72 and 74 bolted to block 80 to seal against nipple 71.

It should be understood that other type connections may be utilized at the connection between the hose 26, the pump 22, and the gun 24. The embodiment of FIGS. 8 and 9 eliminates threaded connectors that have typically been utilized in the past. It is not that the two-part clamp connections of this invention are themselves inventive. Rather, it is the use of such connections in this particular environment which is novel. As such, the details of the connection are not necessarily important, but rather the use of this type of connection, in this application.

It will be appreciated that the present invention provides for the containment of any material which escapes from hose leaks or joint leaks. The present invention precludes the need for placing the delivery system within an enclosed, ventilated booth, and thus greatly enhances the utility of foam delivery systems. The present invention is particularly advantageous for those situations where foam is utilized in a manufacturing process, particularly in a process wherein foam is applied to an article at a number of stages during its manufacture. It should be understood that the present invention may be practiced in a variety of manners and with a variety of application processes. The foregoing drawings, discussion and description are meant to be illustrative of the present invention and not limitations upon the practice thereof. It is the following claims, including all equivalents, which define the scope of the invention.

I claim:

1. A method for containing and limiting leaks in a foam delivery system comprising the steps of:
    a. providing a pump which is operative for delivering a pressurized flow of a material;
    b. providing a gun which is selectably operable to permit or block the pressurized flow of the material;
    c. providing a flexible hose disposed to establish fluid communication, and convey the pressurized flow of material, between the pump and the gun;
    d. providing a flexible, expansible sheath around said hose, said sheath being operative to expand so as to contain any of the material which is released from a leak along said hose;
    e. providing a leak monitor which determines if leakage is occurring, said leak monitor being further operable to provide a control signal; and
    f. monitoring if leakage is occurring and stopping said pump if a leak is detected.

2. A method as in claim 1, including the further step of activating an alarm in response to said control signal.

3. A method of dispensing foam into a vehicle body, comprising the steps of:
    a. providing sources of a pair of foam materials;
    b. providing a pump operative to deliver materials from said sources;
    c. providing a gun in fluid communication with said pump to receive said materials from said pump and dispense said materials;
    d. providing a flexible hose between said pump and said gun to establish fluid communication between said pump and said gun;
    e. providing a leak monitor which determines if leakage is occurring, said leak monitor being operable to provide a control signal if a determination is made that leakage is occurring;
    f. operating the system to dispense material from said material supplies through said pump and into said gun, and from said gun into a vehicle body, and monitoring conditions in said system; and
    g. stopping flow of material through said pump if said leak monitor determines a leak is occurring.

4. A method as recited in claim 3, including the further step of providing a flexible expansible sheath around said hose, said sheath being operable to expand to contain material which leaks from a leak along said hose.

5. A method as recited in claim 3, wherein said leak monitor determines if said pump is delivering flow of material and, further, if said gun is blocking flow of material, the determination being made that leakage is occurring if the pump is delivering flow of material, but said gun is blocking flow of material.

6. A method as recited in claim 5, wherein an alarm is activated in response to said control signal.

7. A method as recited in claim 3, wherein said gun is utilized to dispense foam into a hollow body portion of a vehicle body.

8. A method as recited in claim 3, wherein said expansible sheath expands at the location of a leak, providing an indication of the location of said leak.

9. A foam delivery system comprising:
    a pump which is operative to deliver a pressurized flow of a material;
    a gun which is selectably operable to permit or block the pressurized flow of the material;
    a flexible hose disposed to establish fluid communication between the pump and the dispenser;
    a flexible, expansible sheath covering said hose, said sheath being operative to expand to contain any of the material reagent which is released from a leak along said hose and to provide an indication of the location of said leak by said expansion; and
    a leak monitor which determines if a leak is occurring by monitoring conditions and determining whether a leak is occurring based upon said monitored conditions, said leak monitor being operable to provide a control signal based upon said determination.

10. A foam delivery system as in claim 9, wherein said pump is operative to receive said control signal and terminate delivery of the pressurized flow of material.

11. A foam delivery system as in claim 9, further including an alarm which is activatable by said control signal.

12. A foam delivery system as in claim 9, wherein said leak monitor includes at least one pressure detector disposed to measure the pressure of the material in the delivery system.

13. A foam delivery system as in claim 9, wherein said leak monitor includes a flow meter disposed to measure the flow rate of said material.

14. A foam delivery system as in claim 9, wherein said flexible, expansible sheath comprises an elastomeric material.

15. A foam delivery system as in claim 9, wherein a protective member is disposed about said flexible, expansible sheath.

16. A foam delivery system as in claim 9, wherein said pump is further operative to deliver a second pressurized flow of a second material;
    said gun being operable to permit or block the second pressurized flow of said second material;

said foam delivery system further including a second flexible hose disposed to establish fluid communication between said pump and said gun; and wherein said leak monitor also determines if a leak is occurring by monitoring if said pump is delivering said second flow of said second material and if said gun is blocking the flow of said second material, said leak monitor being further operable to also provide said control signal based upon said determination.

17. A foam delivery system as in claim 16, wherein a single flexible, expansible sheath covers both said hoses.

18. A foam delivery system as in claim 16, further including a second, flexible, expansible sheath covering said second hose, said second sheath being operative to expand to contain any of said second material which is released along said second hose and to provide an indication of the location of said leak by said expansion.

19. A sealant delivery system as in claim 9, further including a connector for coupling said hose to said pump, and a flexible, expansible jacket disposed to cover said connector, said jacket being operative to contain any of the material which is released from a leak at said connector.

* * * * *